C. K. Marshall,
Horse Collar.
No. 105,821.  Patented July 26, 1870.
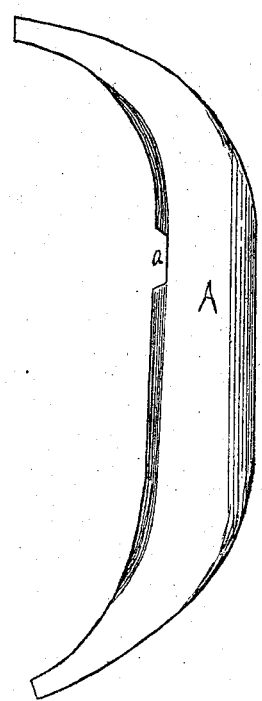
WITNESSES.
Edwin James.
A. Holmead Jr.
INVENTOR.
Charles K. Marshall.
per J. E. J. Holmead.
Attorney.

United States Patent Office.

CHARLES K. MARSHALL, OF NEW ORLEANS, LOUISIANA, ASSIGNOR TO THE CLIMAX HORSE-COLLAR COMPANY, OF NEW YORK CITY.

Letters Patent No. 105,821, dated July 26, 1870.

IMPROVED HORSE-COLLAR.

The Schedule referred to in these Letters Patent and making part of the same.

*To all whom it may concern:*

Be it known that I, CHARLES K. MARSHALL, of New Orleans, in the parish of Orleans and State of Louisiana, have invented certain new and useful Improvements in Horse-Collars; and I do hereby declare that the following is a full, clear, and exact description of the same, reference being had to the accompanying drawing and to the letters of reference marked thereon, making part of this specification, in which is represented one side of the collar in position to be passed over the horse's head.

The nature of my present invention consists in so recessing or "hollowing out" the plates that form the collar as to greatly facilitate the passing of the same over the head of the animal.

While my improvement is admirably adapted to and can be successfully used in all styles of horse-collars, it is peculiarly applicable, and can be, with the greatest advantage, introduced in the manufacture of the collars embraced in and covered by my patents of June 23, 1868, and January 12, 1869.

In the patents referred to, in order to prevent the galling and chafing of the horse, all padding and stuffing are dispensed with, and the entire collar is constructed of metal, wood, gutta-percha, or other hard, unyielding substance.

The material used being such as to allow the collar but little, if any, elasticity, when the same is "closed" or constructed in one piece, it is apt, as are more or less all other collars, to scar or skin the horse as it passes over the animal's head, especially at the frontal bone, or upper section of the socket that surrounds the eye.

My present improvement entirely obviates this difficulty, as the recesses are formed at such points on the collar-plates that, when the collar is passed over the head, the bones referred to meet no portion of the same, as the recesses protect the animal's head from all direct contact with the unyielding surface of the metal, wood, or other substance out of which the collar is made.

To enable others skilled in the art to make and use my invention, I will now proceed to describe its construction and operation.

A represents one of the plates, or a half section of the collar, and is recessed, as shown at *a*. This recess *a* may be of any desired form.

The section of the collar that is recessed is that portion of the same which passes over the frontal bone or upper wall of the socket that incloses the eye when the collar is to be applied.

This bone always protrudes, and consequently, when the collar is not recessed or "hollowed out," it is difficult to force the same over the eye and its socket.

This is true even with the padded and stuffed collar, which is more or less yielding, but with collars constructed of a hard, unyielding surface the recess is absolutely indispensable, in order to prevent the scarring or skinning of the animal at the point referred to.

Having thus fully described my invention,

What I claim therein as new, and desire to secure by Letters Patent of the United States, is—

The collar-plate A, provided with a recess, *a*, substantially as described, as and for the purpose specified.

In testimony whereof I have signed my name to this specification in the presence of two subscribing witnesses.

C. K. MARSHALL.

Witnesses:
 EDWIN JAMES,
 FRED. KOONES.